UNITED STATES PATENT OFFICE.

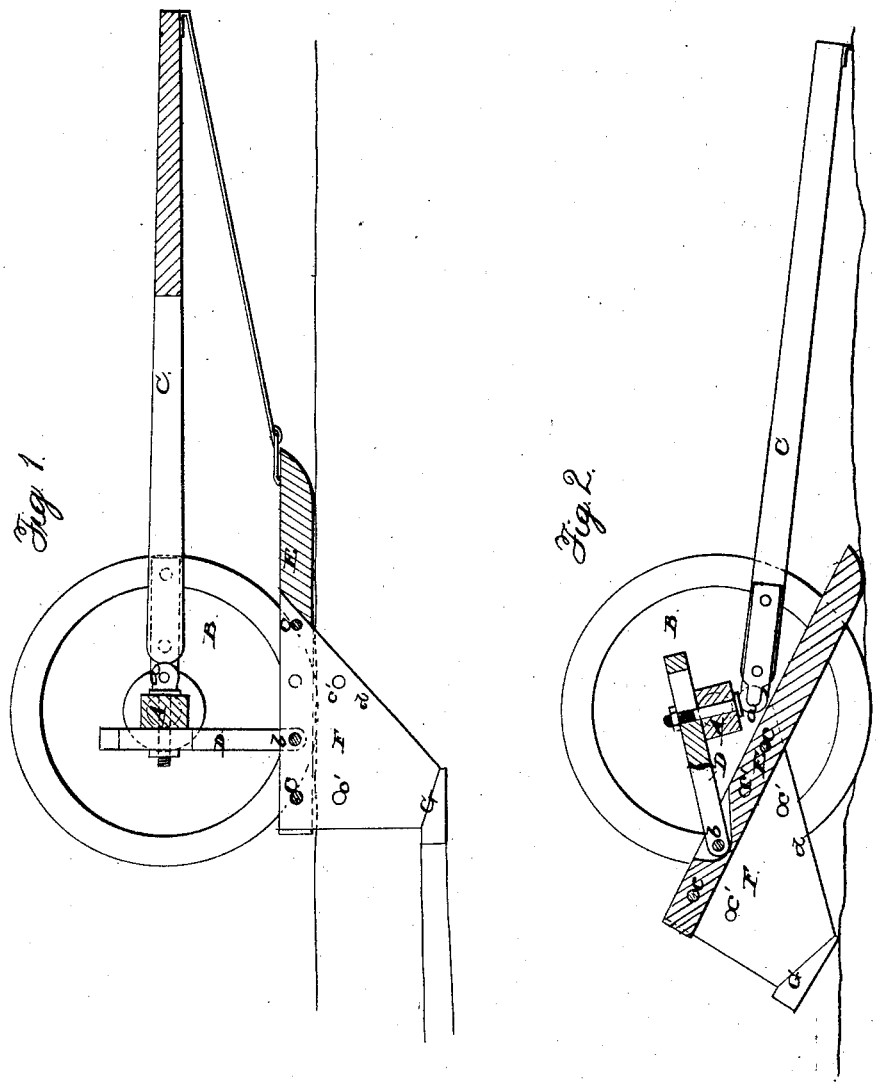

MOSES BUCKLIN, OF GRAFTON, NEW HAMPSHIRE.

IMPROVED DRAINING-MACHINE.

Specification forming part of Letters Patent No. 24,928, dated August 2, 1859.

*To all whom it may concern:*

Be it known that I, MOSES BUCKLIN, of Grafton, in the county of Grafton and State of New Hampshire, have invented a new and Improved Draining-Machine; and I do hereby declare that the following is a full, clear, and exact description of the same, reference being had to the accompanying drawings, forming a part of this specification, in which—

Figure 1 represents a longitudinal vertical central section of my draining-machine when in a working position, and Fig. 2 is a similar section of the same when out of use and arranged to be drawn from place to place.

Similar letters in both figures refer to corresponding parts.

The object of this invention is to make drains sufficiently deep under ground that the same are protected as much as possible against external influences; and the invention consists in arranging a wedge-shaped share at the lower end of a cutter, the cutting-edge of which is sloping up from the share toward the board or platform, to which it is fastened by means of screws, so that the same, together with the platform and with the share, can be drawn through the ground, whereby the share is caused to cut an underground drain; and the invention further consists in arranging said cutter and the platform in such a manner that each of them can be adjusted—the cutter according to the depth in which the drain is to be made and the platform in order to adjust the same to the height of the different wheels.

To enable those skilled in the art to fully understand and construct my invention, I will proceed to describe it.

A represents a beam the ends of which are rounded, so that it serves as axle for two wheels, B B. Secured to this beam, by means of eye-bolts *a*, is the draft-pole C on one side, and slotted bars D are secured to the other side of this beam by means of the same bolts in such a manner that they can be shifted up and down in order to adjust them to the height of different wheels.

Attached to the bars D, by means of pivots *b*, is the platform E, to which the cutter-blade F is fastened by means of screw-bolts *c*, and this blade is provided with several rows of holes, *c'*, so that it can be adjusted in the platform E according to the depth to which it is expected to cut. The cutting-edge *d* of this blade is sloping up from its lower end, and firmly secured to the lower extremity of the blade is the plowshare G, which forms a solid wedge, with its sides rounded or flat, as may be most desirable.

The operation is as follows: The front edge of the platform E is connected with an eye-bolt in the front part of the draft-pole by means of a chain or rope, and the cutter-blade F, together with the plowshare G, is forced down into the ground until the platform rests flat on the same, as clearly represented in Fig. 1, and the bars D are so adjusted that the wheels B touch the ground. The machine is now drawn along and the share G forces the ground open, and by reason of its wedge form presses it out toward the sides and to the top, so as to open a drain, and the cutter-blade F is so thin that the incision made by the same in the ground closes up again as soon as the machine has passed over, so that the drain made by the share G has no direct communication with the surface, while the same serves most effectually to carry off the water. The platform E is kept down upon the ground by the action of the plowshare G, and if the cutter-blade meets with an obstruction it passes over the same quite readily by reason of the sloping position of the cutting-edge.

The depth of the drain under the surface is regulated by raising and lowering the cutter-blade in the platform by means of the screw-bolts *c*. It will be readily understood that the plowshare can be made triangular, rounded, or, in fact, of any other desirable form, as long as it preserves the shape of a wedge, so that it enters the ground with its point, and that the sides of the drain are firmly pressed, so that the ground sustains itself after the share has passed.

When the machine is not used the platform E is untied from the eyebolt in the draft-pole, and it, together with the cutter-blade F and share G, is brought into a position as represented in Fig. 2, so that it can be readily drawn from place to place.

The platform E, together with the blade F and share G, can readily be adjusted to any pair of wheels whatever, as the bars D can be lengthened or shortened to suit different heights, and it is not necessary, therefore, to construct extra wheels for this purpose, whereby the expense of this machine is materially lessened.

What I claim as new, and desire to secure by Letters Patent, is—

1. The arrangement of the platform E with the cutter-blade F and plowshare G, for the purpose of cutting underground drains, substantially in the manner specified.

2. Arranging the blade F with a sloping cutting-edge, $d$, so that the same more readily passes over obstructions which may come in its way, substantially as described.

3. The arrangement and combination of the platform E, the cutter-blade F, and the plowshare G with the adjustable bars D and wheels B, to operate substantially in the manner and for the purpose herein described.

MOSES BUCKLIN.

Witnesses:
FRANCIS R. SMITH,
JOHN R. SMITH.